Figure 1:
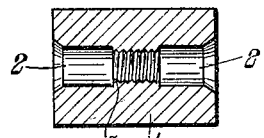

C. E. JOHANSSON.
GAGE FOR MEASURING HOLES.
APPLICATION FILED DEC. 17, 1914.

1,217,313. Patented Feb. 27, 1917.

Witnesses:

Inventor:
Carl Edward Johansson

UNITED STATES PATENT OFFICE.

CARL EDVARD JOHANSSON, OF ESKILSTUNA, SWEDEN.

GAGE FOR MEASURING HOLES.

1,217,313.

Specification of Letters Patent.

Patented Feb. 27, 1917.

Application filed December 17, 1914. Serial No. 877,651.

*To all whom it may concern:*

Be it known that I, CARL EDVARD JOHANSSON, a subject of the King of Sweden, residing at Eskilstuna, in the Kingdom of Sweden, have invented new and useful Improvements in Gages for Measuring Holes, of which the following is a specification, reference being had to the drawing accompanying and forming part of this application.

This invention relates to gages used in machine shops and mechanical works for accurate measuring of holes, and more particularly to cylindrical gages which are made either as standard gages, provided with only one plug of the desired exact dimension corresponding to the hole, or as allowance or limit gages sometimes with one but generally with two plugs. The plugs of these gages are either made solid or they are recessed or bored out in the end turned away from the handle in order to reduce the weight. The gage will thus have the shape of a cup to the bottom of which the handle is secured. The bottom of the plug will thus be rigid while at the other end the walls lack proper support, which will result in this that the plug especially if it is of a considerable length, will more easily change its shape during the manufacture and will lose its circular form owing to internal stresses in the material, which circumstance, in addition to the disadvantages above related, will also cause loss of time in the manufacture of the gages. A further disadvantage with gages of this form is that the gage when worn in the outer end cannot be used for measuring holes of small depths, because only the end adjacent to the handle still possesses the accurate dimension, but this portion of the plug cannot reach into the hole that is to be gaged.

This invention relates to a gage for accurate measuring of holes, the object of my invention being to avoid the above-mentioned disadvantages of gages as hitherto used. My invention is broadly characterized by this that the gaging member (the plug) is symmetrical or nearly symmetrical in relation to a central plane perpendicular to the axis of the plug and provided with recesses of the same or about the same depth at both ends in such a manner that a disk-shaped portion is left in the center forming a uniform support of the circumferential walls of the plug. In this manner the gage is less apt to lose its shape and the advantage is also gained that the handle may be attached to both ends of the plug without changing the shape and dimensions of the gage as a whole, for which reason cases and tool-racks already at hand for keeping the instrument and above all those for keeping a whole set of such gages may still be advantageously used.

Figure 2:
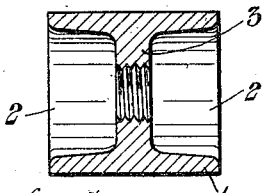
Figure 3:
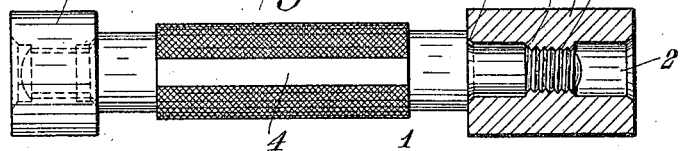
Figure 4:
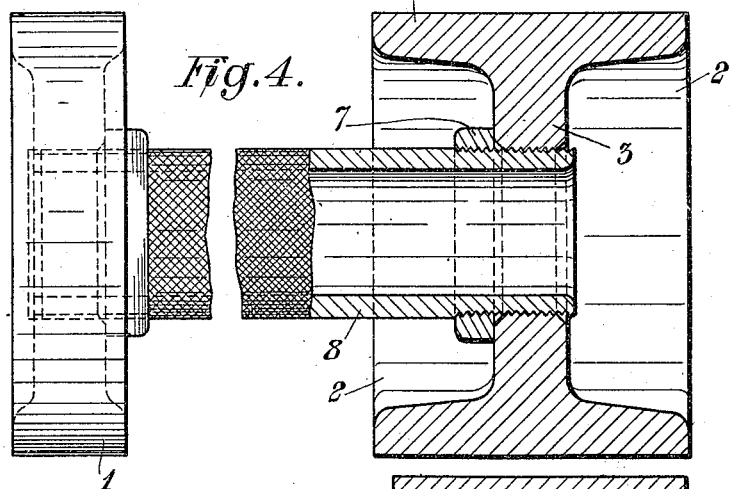
Figure 5:
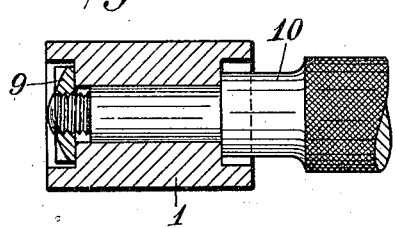
Figure 6:
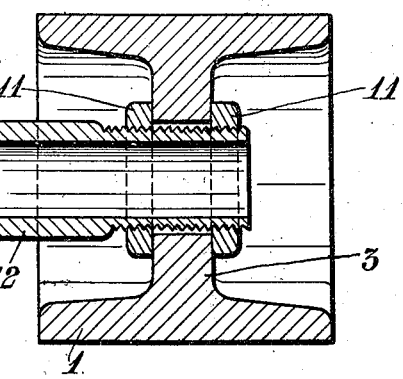

In the accompanying drawing I have shown some constructional forms embodying my invention. Figure 1 shows a longitudinal section of a plug for comparatively small gages, and Fig. 2 shows a similar view of a plug for larger gages. Fig. 3 illustrates one manner of attaching a plug as shown in Fig. 1 to the handle, and Fig. 4 illustrates a manner of attaching a plug as shown in Fig. 2, a portion of the handle being broken away. Fig. 5 shows another small plug attached to its handle, and Fig. 6 shows a different manner of attaching a comparatively large plug to its handle.

The plug 1 of my improved gage is, according to Figs. 1 and 2, of a symmetrical shape and is provided with recesses 2 of the same or about the same width and depth at both ends, so that the remaining disk-like portion 3, which is located at one end in constructions hitherto used, will be located in the center of the plug giving the same more stability and resistance. The recesses will not be so deep as when bored out in one end only, and both ends of the plug will be equally supported, changes in the shape during and after the manufacture due to internal stresses thus being avoided as much as possible.

It is evident that a gage of this construction may be used so, that when the end opposite the handle is worn and no longer holds the accurate measure, the plug may be turned so that the other end which has been more protected against wearing and, therefore, holds the accurate measure will be used. The plug will thus serve as an accurate gage twice as long time.

In Fig. 3 I have shown the mode of securing small plugs to the handle 4. The recesses 2 at both ends of the plug 1 are of a comparatively small depth and the central disk 3 is only large enough to leave sufficient material for the threads when the hole for the handle has been drilled. The handle, which preferably is made solid for small gages is provided with a threaded stud 5 to suit the hole in the disk. A shoulder 6 on the handle bearing against the end surface of the plug when the handle is screwed into the same, will effect a rigid connection between the plug and the handle, making nuts superfluous.

In Fig. 4 the manner of securing big plugs to the handle is shown. The recess 2 being comparatively wide, the handle cannot bear against the end surface of the plug, but extends into the recess and with a ring or flange 7 bears against the central disk 3, where the end of the handle is threaded into the disk. The handle 8 is preferably made hollow for large gages in order to reduce the weight and to gain more accuracy in measuring on account of the increased sensitivity in using the same. The ring 7 may consist of a ring nut threaded on the handle.

In Figs. 5 and 6 two different methods of securing the handle to the plug are shown. Fig. 5 shows a small plug attached to a solid handle 10 by means of a nut 9, and Fig. 6 shows a large plug secured to a hollow handle 12 by means of two nuts 11.

It is evident from Figs. 3–6 that on account of the symmetrical shape of the gage a standard or an allowance plug will get exactly the same dimensions and shape if the plug is attached to the handle in reversed position.

I claim:

1. A gage for measuring holes consisting of a plug of approximately symmetrical shape in relation to a central plane perpendicular to its axis and provided at both ends with recesses of approximately equal depth, leaving a central disk-like portion, said disk-like portion being provided with means for receiving a handle from either side, substantially as and for the purpose set forth.

2. A gage for measuring holes consisting of a plug of approximately symmetrical shape in relation to a central plane perpendicular to its axis and provided at both ends with recesses of approximately equal depth, leaving a central disk-like portion, said disk-like portion being provided with means for receiving a handle from either side, in combination with a handle for said gage, said handle provided with a shoulder bearing against the plug, substantially as and for the purpose set forth.

3. A gage for measuring holes consisting of a plug of approximately symmetrical shape in relation to a central plane perpendicular to its axis and provided at both ends with recesses of approximately equal depth, leaving a central disk-like portion, said disk-like portion being provided with means for receiving a handle from either side, in combination with a handle for said gage, said handle provided with a shoulder bearing against the end surface of the plug, substantially as and for the purpose set forth.

4. A gage for measuring holes consisting of a plug of approximately symmetrical shape in relation to a central plane perpendicular to its axis and provided at both ends with recesses of approximately equal depth, leaving a central disk-like portion, said disk-like portion being provided with means for receiving a handle from either side, in combination with a handle for said gage, said handle provided with a shoulder bearing against the central disk-like portion of the plug, substantially as and for the purpose set forth.

CARL EDVARD JOHANSSON.

Witnesses:
 FREDRIK SCHMITSELÖW,
 THURE ÖSTERLING.